US012347989B2

(12) United States Patent
Yeh et al.

(10) Patent No.: US 12,347,989 B2
(45) Date of Patent: Jul. 1, 2025

(54) CABLE CONNECTION COMPONENT AND CABLE ASSEMBLY

(71) Applicant: BO-JIANG TECHNOLOGY CO., LTD., Tainan (TW)

(72) Inventors: Chun-Hung Yeh, Tainan (TW); Chih-Yung Chen, Tainan (TW); Pei-Ju Li, Tainan (TW)

(73) Assignee: BO-JIANG TECHNOLOGY CO., LTD., Tainan (TW)

( * ) Notice: Subject to any disclaimer, the term of this patent is extended or adjusted under 35 U.S.C. 154(b) by 473 days.

(21) Appl. No.: 17/972,565

(22) Filed: Oct. 24, 2022

(65) Prior Publication Data

US 2023/0396000 A1 Dec. 7, 2023

(30) Foreign Application Priority Data

Jun. 1, 2022 (TW) ................................ 111205777

(51) Int. Cl.
*H01R 4/28* (2006.01)
*H01B 7/17* (2006.01)
*H01B 7/40* (2006.01)

(52) U.S. Cl.
CPC ................. *H01R 4/28* (2013.01); *H01B 7/17* (2013.01); *H01B 7/40* (2013.01)

(58) Field of Classification Search
CPC ...... H01R 4/28; H01R 2103/00; H01R 24/40; H01R 13/629; H01R 13/502; H01B 7/17; H01B 7/40
See application file for complete search history.

(56) References Cited

U.S. PATENT DOCUMENTS

| | | | | | |
|---|---|---|---|---|---|
| 2,870,420 | A * | 1/1959 | Malek | H01R 9/0521 | 333/260 |
| 3,673,546 | A * | 6/1972 | Green | H01R 24/542 | 439/675 |
| 4,596,435 | A * | 6/1986 | Bickford | H01R 24/542 | 439/582 |
| 4,934,960 | A * | 6/1990 | Capp | H01R 13/6625 | 439/620.09 |
| 4,943,245 | A * | 7/1990 | Lincoln | H01R 24/44 | 439/578 |
| 6,827,608 | B2 * | 12/2004 | Hall | H01R 24/40 | 439/654 |

(Continued)

*Primary Examiner* — Thanh Tam T Le

(74) *Attorney, Agent, or Firm* — Li & Cai Intellectual Property Office

(57) ABSTRACT

A cable assembly and a cable connection component are provided. The cable assembly includes a cable and a cable connection component. The cable connection component includes a first outer metal member, a second outer metal member and a holding component. The second outer metal member has an end for interlocking with an end of the first outer metal member. The holding component is disposed between the first outer metal member and the second outer metal member. The holding component includes two inner metal members that are fixed to each other by a fixing member. Each inner metal member includes a wire slot, the wire slot includes an end section and two branch sections, the two end sections jointly hold a portion of the cable in place, and each branch section of the two inner metal members jointly hold one of core wires of the cable in place.

10 Claims, 7 Drawing Sheets

(56) References Cited

U.S. PATENT DOCUMENTS

| | | | | |
|---|---|---|---|---|
| 7,128,604 | B2 * | 10/2006 | Hall | H01R 24/542<br>439/485 |
| 8,414,327 | B2 * | 4/2013 | Mana | H01R 13/533<br>439/578 |
| 8,585,438 | B2 * | 11/2013 | Tang | H01R 13/6583<br>439/578 |
| 9,147,955 | B2 * | 9/2015 | Hanson | H01R 13/6591 |
| 9,147,963 | B2 * | 9/2015 | Balcer | H01R 9/0524 |
| 9,608,344 | B2 * | 3/2017 | Zhang | H01R 43/0235 |
| 11,031,731 | B2 * | 6/2021 | Montena | H01R 24/40 |
| 11,509,075 | B2 * | 11/2022 | Smith | H01R 13/5219 |

* cited by examiner

CABLE CONNECTION COMPONENT AND CABLE ASSEMBLY

CROSS-REFERENCE TO RELATED PATENT APPLICATION

This application claims the benefit of priority to Taiwan Patent Application No. 111205777, filed on Jun. 1, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a cable connection component and a cable assembly, and more particularly to a cable connection component suitable for a twinax cable and a cable assembly including a twinax cable.

BACKGROUND OF THE DISCLOSURE

Existing twinax cables that are commonly available can be easily affected by external forces, causing the cables to be moved relative to a corresponding housing.

SUMMARY OF THE DISCLOSURE

In response to the above-referenced technical inadequacies, the present disclosure provides a cable connection component and a cable assembly to improve the existing twinaxial cables that are easily affected by external forces to be moved relative to a corresponding housing.

In one aspect, the present disclosure provides a cable connection component adapted to fix an end of a cable, the cable including an outer insulator and two core wires, the two core wires being wrapped by the outer insulator, each of the core wires including an inner conductor and an insulator, and the inner conductor being wrapped by the insulator, the cable connection component includes: a first outer metal member, a second outer metal member and a holding member. The first outer metal member has a guiding structure at an end thereof, two connection conductors are disposed in the first outer metal member, and two insulating structures are disposed between the two connection conductors and the first outer metal member, respectively; the second outer metal member has an end detachably fixed to the end of the first outer metal member; and the holding component is disposed between the first outer metal member and the second outer metal member and being held in place by the first outer metal member and the second outer metal member, the holding component has a guide structure at an end thereof for engaging with the guide structure of the first outer metal member; the holding component includes two inner metal members, and the two inner metal members are fixed to each other by at least one fixing member, each of the inner metal members includes a wire slot, the wire slot includes an end section and two branch sections, an end of the two branch sections is connected with the end section, the end sections of the wire slots of the two inner metal members jointly hold a portion of the cable in place, the branch sections of the two inner metal members jointly hold the insulator of one of the core wires in place, and the inner conductor of each of the core wires is exposed at the end of the holding component, and is connected to the two connecting conductors of the two first outer metal members.

In another aspect, the present disclosure provides a cable assembly, which includes: a cable and a cable connection component. The cable includes an outer insulator and two core wires, the two core wires are wrapped by the outer insulator, each of the core wires includes an inner conductor and an insulator, the inner conductor is wrapped by the insulator; the cable connection component is used for fixing an end of the cable and includes: a first outer metal member, a second outer metal member and a holding member. The first outer metal member has a guiding structure at an end thereof, two connection conductors are disposed in the first outer metal member, and two insulating structures are disposed between the two connection conductors and the first outer metal member, respectively; the second outer metal member has an end for interlocking with the end of the first outer metal member; and the holding component is disposed between the first outer metal member and the second outer metal member and being held in place by the first outer metal member and the second outer metal member, the holding component has a guide structure at an end thereof for engaging with the guide structure of the first outer metal member; the holding component includes two inner metal members, and the two inner metal members are fixed to each other by at least one fixing member, each of the inner metal members includes an end section and two branch sections, an end of the two branch sections is connected with the end section, the end sections of the two inner metal members jointly hold a portion of the cable in place, the branch sections of the two inner metal members jointly hold the insulator of one of the core wires in place, and the inner conductor of each of the core wires is exposed at the end of the holding component, and is connected to the two connecting conductors of the two first outer metal members.

Therefore, in the cable assembly and cable connection component provided by the present disclosure, through the above design of the first outer metal member, the second outer metal member, the two inner metal members included in the holding member, and the wire slot of each of the inner metal members, the cable assembly and the cable connection component can be provided with excellent anti-interference capabilities.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
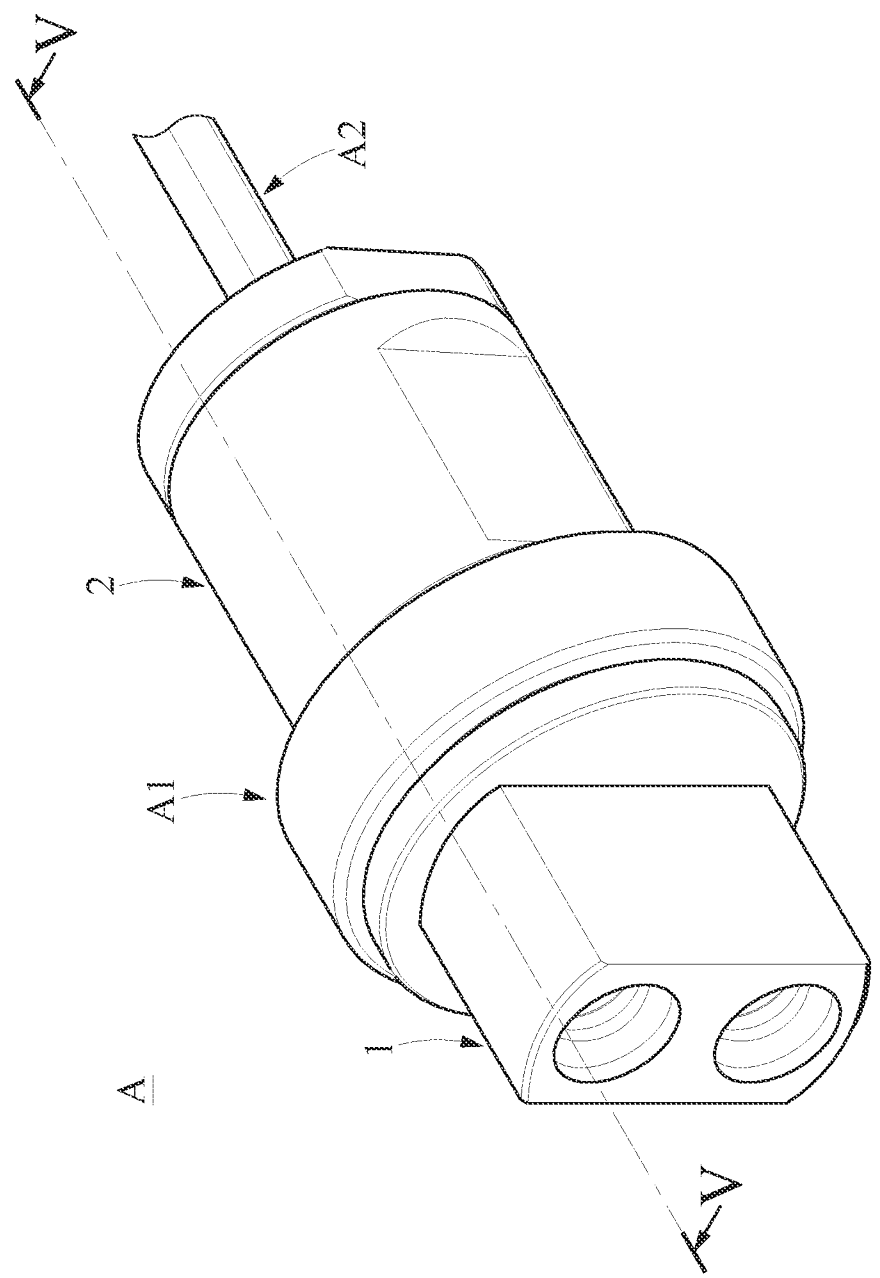
FIG. 1 is a schematic diagram of a cable assembly of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
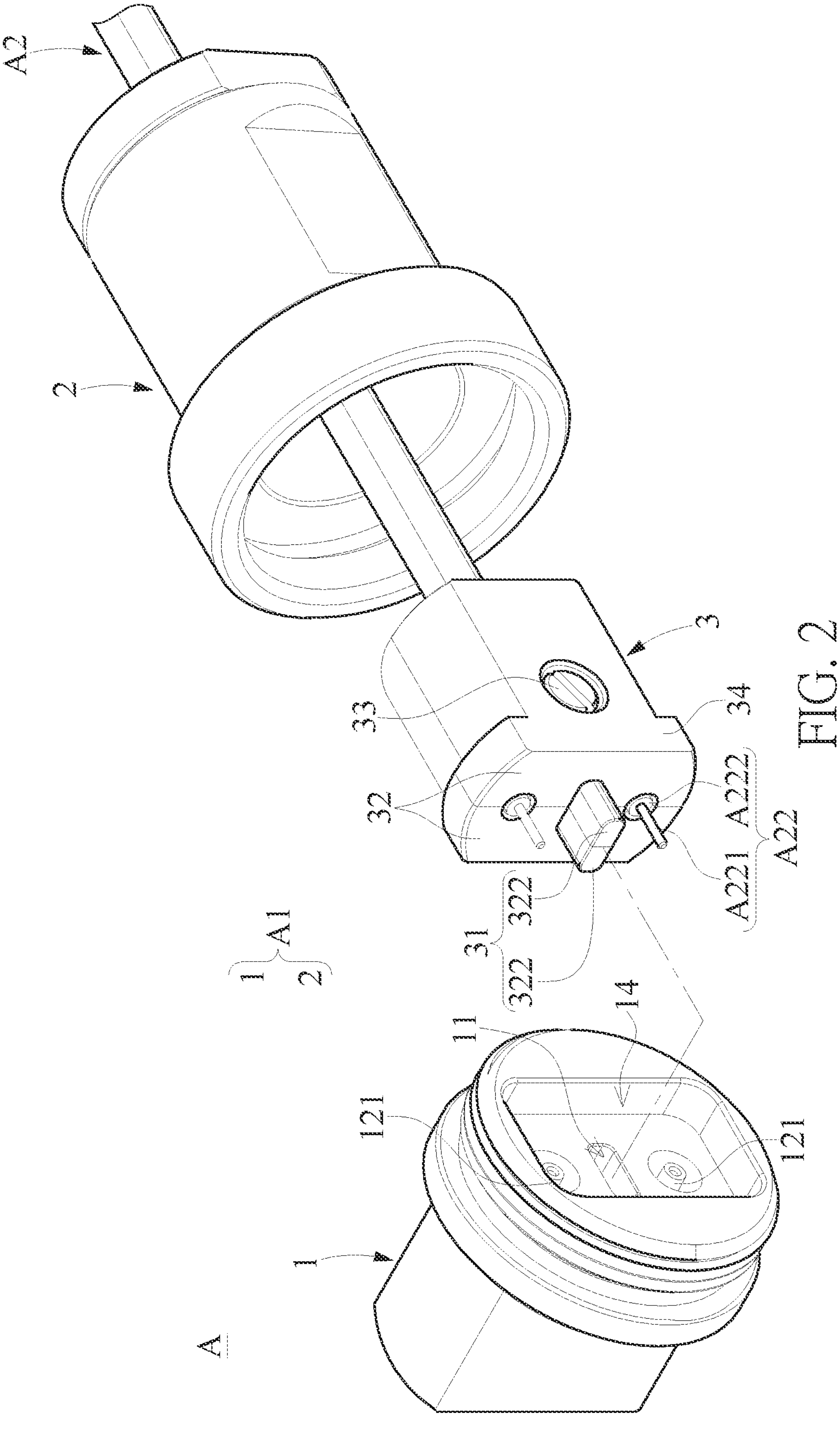
FIG. 2 and FIG. 3 are respectively exploded schematic views of different components of the cable assembly of the present disclosure.
Figure 3:
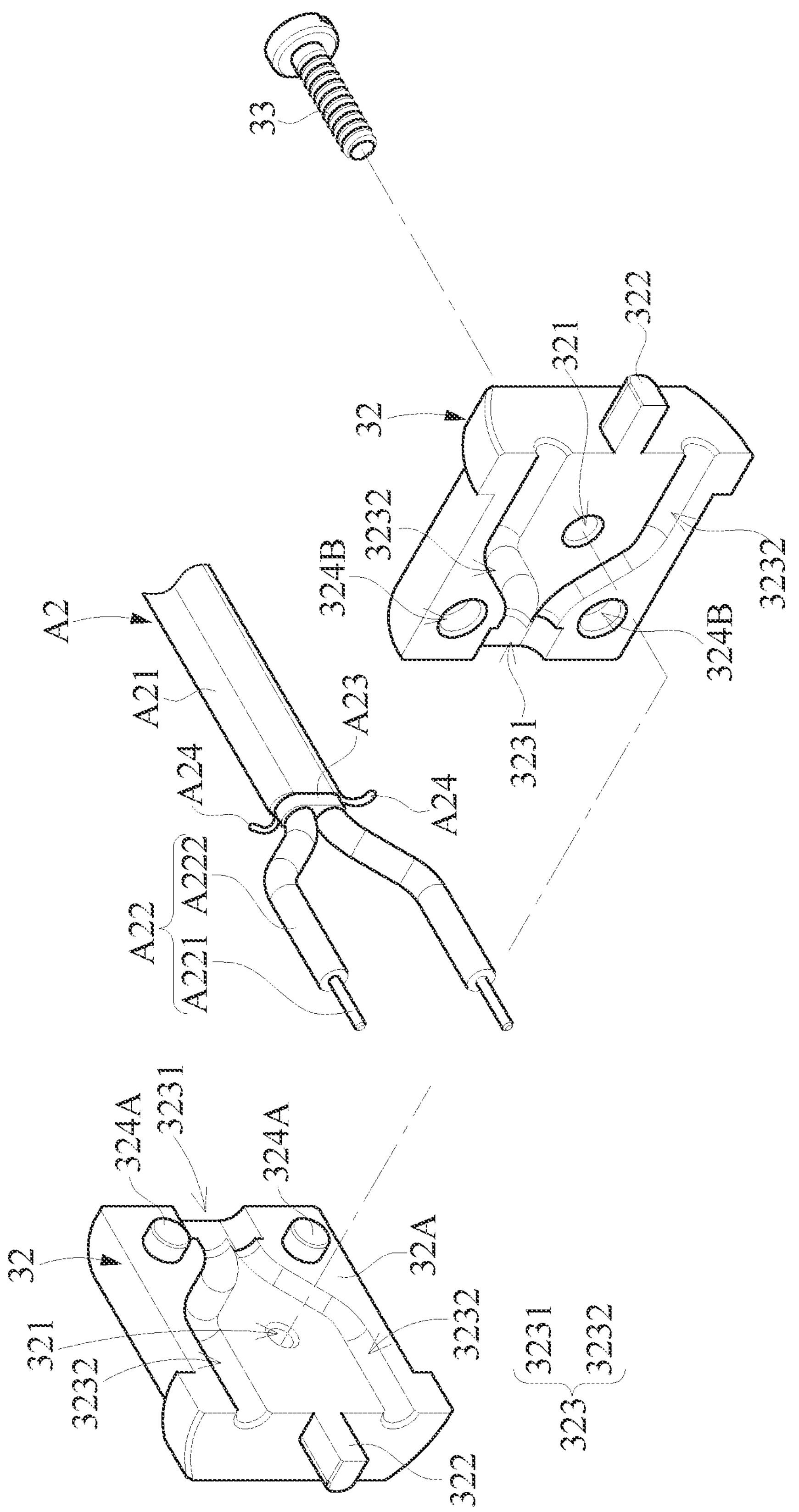
Figure 4:
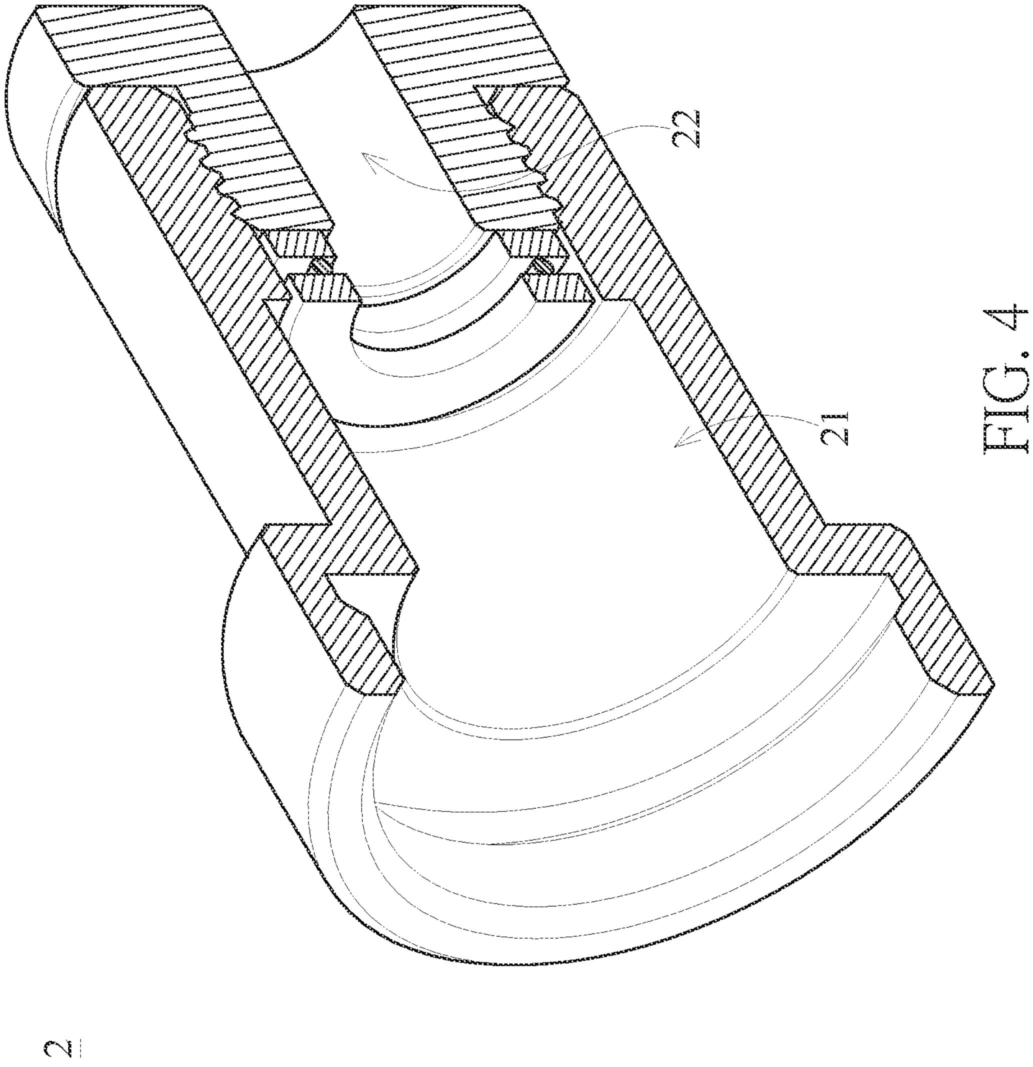
FIG. 4 is a schematic cross-sectional view of a second outer metal member of a cable connection component of the cable assembly of the present disclosure.
Figure 5:
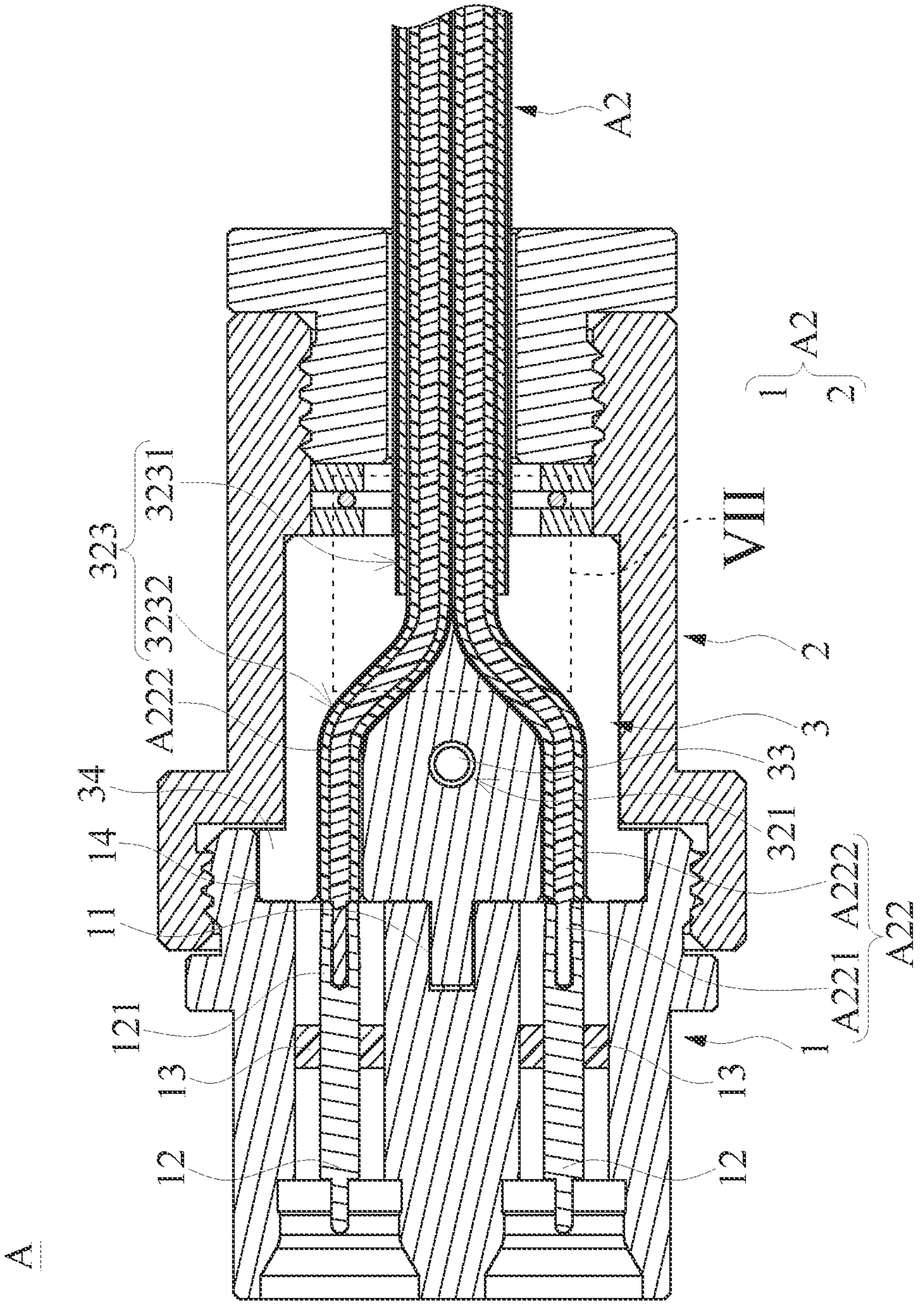
FIG. 5 is a schematic cross-sectional view of the cable assembly of the present disclosure.

Reference is made to FIGS. 1 to 5, FIG. 1 is a schematic diagram of a cable assembly of the present disclosure, FIG. 2 and FIG. 3 are respectively exploded schematic views of different components of the cable assembly of the present disclosure, FIG. 4 is a schematic cross-sectional view of a second outer metal member of a cable connection component of the cable assembly of the present disclosure, and FIG. 5 is a schematic cross-sectional view of the cable assembly of the present disclosure.

A cable assembly A of the present disclosure includes a cable connecting component A1 and a cable A2. The cable connection component A1 is used to fix an end of the cable A2. The cable connection component A1 includes a first outer metal member 1, a second outer metal member 2 and a holding component 3. The first outer metal member 1 has a guiding structure 11 at an end thereof, two connection conductors 12 are disposed in the first outer metal member 1, and two insulating structures 13 are disposed between the two connection conductors 12 and the first outer metal member 1, respectively. Each of the connecting conductors 12 has a clamping structure 121, and the clamping structure 121 is used for clamping an end of an inner conductor A221 of each of the core wires A22 included in the cable A2.

The second outer metal member 2 has an end detachably fixed to the guiding structure 11 of the first outer metal member 1. In practical applications, the first outer metal member 1 and the second outer metal member 2 can have corresponding thread structures, respectively, and the first outer metal member 1 and the second outer metal member 2 can be interlocked through the corresponding thread structures.

The holding component 3 is disposed between the first outer metal member 1 and the second outer metal member 2, and the holding component 3 is held by the first outer metal member 1 and the second outer metal member 2. The holding component 3 has a guide structure 31 at an end thereof for engaging with the guide structure 11 of the first outer metal member 1. In practical applications, the guide structure 11 of the first outer metal member 1 can be a rectangular groove, and the guide structure 31 of the holding component 3 can correspondingly be a rectangular structure. When the guide structure 11 of the first outer metal member 1 and the guiding structure 31 of the holding component 3 are engaged with each other, the holding component 3 will be unable to be rotated relative to the first outer metal member 1, thereby effectively reducing damages to the core wires A22 included in the cable A2 caused by relative rotation of the first outer metal member 1 and the holding component 3. In addition, through the design of the guide structures 11 and 31, technical personnel can also be assisted in assembling the first outer metal member 1 and the holding component 3 more conveniently.

The holding component 3 includes two inner metal members 32 and a fixing member 33, and the two inner metal members 32 are fixed to each other by the fixing member 33. For example, each inner metal member 32 can include a through hole 321, and the fixing member 33 can be a screw, a portion of the fixing member 33 passes through one of the through holes 321, and an end of the fixing member 33 is locked in another through hole 321 having an inner wall with threads. By having the holding component 3 include the two inner metal members 32 and the fixing member 33 so as to hold the end of the cable A2 in place, a size of each of the members during the production process can be more accurately controlled, and each of the members with such design can be easily assembled by technical personnel.

In practical applications, an end of each inner metal member 32 can have a protruding structure 322, therefore, when the two inner metal members 32 are fixed to each other by the fixing member 33, the two protruding structures 322 will together form the guiding structure 31. In special applications, the guide structure 31 of the holding component 3 can also be formed in only one inner metal member 32.

A wide side surface 32A of each inner metal member 32 is concavely formed with a wire slot 323, the wire slot 323 includes an end section 3231 and two branch sections 3232, an end of each of the two branch sections 3232 is connected to the end section 3231, the other end of each of the two branch sections 3232 is disposed adjacent to the end of the inner metal member 32 where the guide structure 31 is formed, the other ends of the two branch sections 3232 are spaced apart from each other, and the wire slots 323, as a whole, are presented as a shape similar to that of the letter “Y.” Through the Y-shaped design of the wire slot 323 as a whole, the clamped cable A2 can be effectively prevented from moving back and forth relative to the inner metal member 32.

Specifically, the protruding structure 322 of each inner metal member 32 can be located between the two branch sections 3232 correspondingly. In practical applications, a size of each of the wire slots 323 can be slightly smaller than a size of the core wire A22, and each of the core wires A22 can be engaged in the wire slot 323, such that it is convenient for the technical personnel to fix the two core wires A22 and the holding component 3 to each other.

Sides of the two inner metal members 32 have the wire slots 323 formed therewith arranged to face each other, portions of the end sections 3231 of the two inner metal members 32 are used to jointly hold a portion of the cable A2 in place, the branch sections 3232 of the two inner metal members 32 jointly hold the insulator A222 of the core wire A22 in place, and the inner conductor A221 of each core wire A22 is exposed at the end of the holding component 3 where the protruding structure 322 is formed, and is connected with the two connection conductors 12 of the two connection conductors 12.

It should be noted that, through the design of each wire slot 323 with the end section 3231, in a process of fixing the cable A2 and the holding component 3 to each other, the technical personnel can first have a portion of the cable A2 be engaged with the end section 3231, and then have the two core wires A22 be fixed to the two branch sections 3232, respectively, such that an assembly of the cable A2 and the holding component 3 can be completed in a relatively convenient and easy way, especially in a case where a size of the holding component 3 is relatively small.

In a preferred embodiment, a side of one of the inner metal members 32 that has the wire slot 323 formed therewith has two positioning structures 324A, a side of another one of the inner metal members 32 that has the wire slot 323 formed therewith has two positioning structures 324B, the two positioning structures 324A can be engaged with the two positioning structures 324B, and the two inner metal members 32 can be fixed to each other by the four positioning structures 324A and 324B. In practical applications, at least one of the positioning structures 324A of one of the inner metal members 32 is, for example, a post structure, and at least one of the positioning structures 324B of another inner metal member 32 can correspondingly be a groove structure. Through the design of the positioning structures 324A, 324B, the technical personnel can first fix the two inner metal members 32 to each other through the positioning structures 324A and 324B, and then use the fixing member 33 to lock the two inner metal members 32 to each other.

As shown in FIG. 2, the end of the first outer metal member that has the guide structure formed therewith further has a limiting groove 14, the holding component 3 has a limiting portion 34 for engaging with the limiting groove 14, and accordingly restricts a range of motion in which the holding component 3 and the first outer metal member 1 can rotate relative to each other. Specifically, the limiting groove 14 can be, for example, a rectangular groove, and the limiting portion 34 can correspondingly be a rectangular structure. Through the design of the limiting groove 14, the first outer metal member 1 and the holding component 3 are basically unable to be rotated relative to each other, so that the core wires A22 can be prevented from being twisted and broken due to relative rotation of the first outer metal member 1 and the holding assembly 3.

As shown in FIGS. 2 and 5, in practical applications, a length of the guide structure 31 of the holding component 3 in an axial direction (Y-axis direction of coordinates shown in FIG. 5) can be made to be larger than a length of the core wire A22 that is exposed to the holding component 3 in the axial direction. Therefore, in a process of connecting the inner conductors A221 of the two core wires A22 and the connection conductor 12 of the first outer metal member 1 to each other performed by the technical personnel, before the inner conductor A221 of the two-core wire A22 is connected to the connection conductor 12 of the first outer metal member 1, the guide structure 31 of the holding assembly 3 will be engaged with the guide structure 11 of the first outer metal member 1, thereby ensuring that the inner conductor A221 of each core wire A22 can be correctly connected to the clamping structure 121 of the connecting conductor 12 of the first outer metal member 1.

As shown in FIGS. 3 and 4, the second outer metal member 2 has an end that is recessed to form an accommodating groove 21, the second outer metal member 2 has a wire hole 22 at another end thereof, the wire hole 22 penetrates the second outer metal member 2, and the wire hole 22 communicates with the accommodating groove 21. Another end of the holding component 3, which is opposite to the end with the two core wires A22 exposed, is correspondingly snap-fitted into and disposed in the accommodating groove 21 of the second outer metal member 2, and the holding component 3, as a whole, is disposed in the first outer metal member 1 and the second outer metal member 2. Preferably, a size of the limiting portion 34 of the holding component 3 is larger than an inner diameter of the accommodating groove 21, and when the holding component 3 is accommodated in the accommodating groove 21, the limiting portion 34 is the end that is correspondingly exposed from the accommodating groove 21. In this way, it is convenient for technical personnel to assemble the first outer metal member 1, the second outer metal member 2 and the holding assembly 3.

Figure 6:
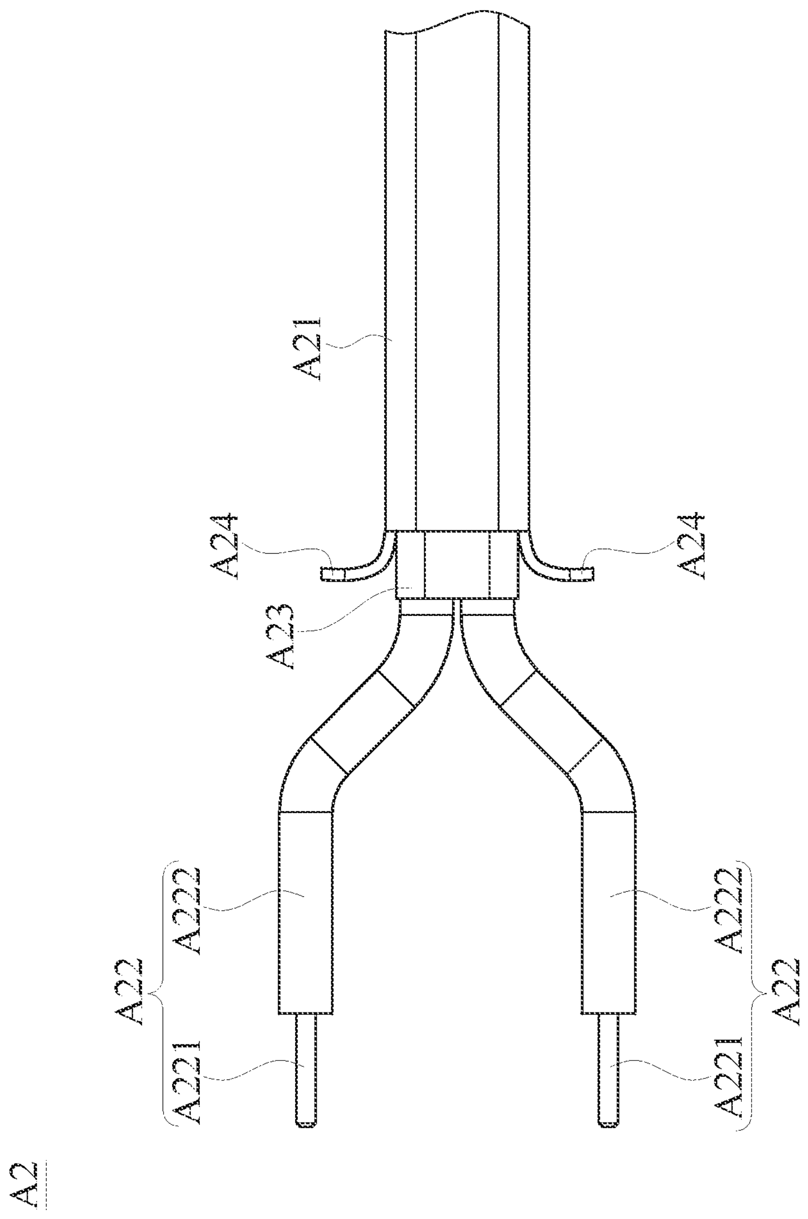
FIG. 6 is a schematic diagram of a cable of the cable assembly of the present disclosure.
Figure 7:
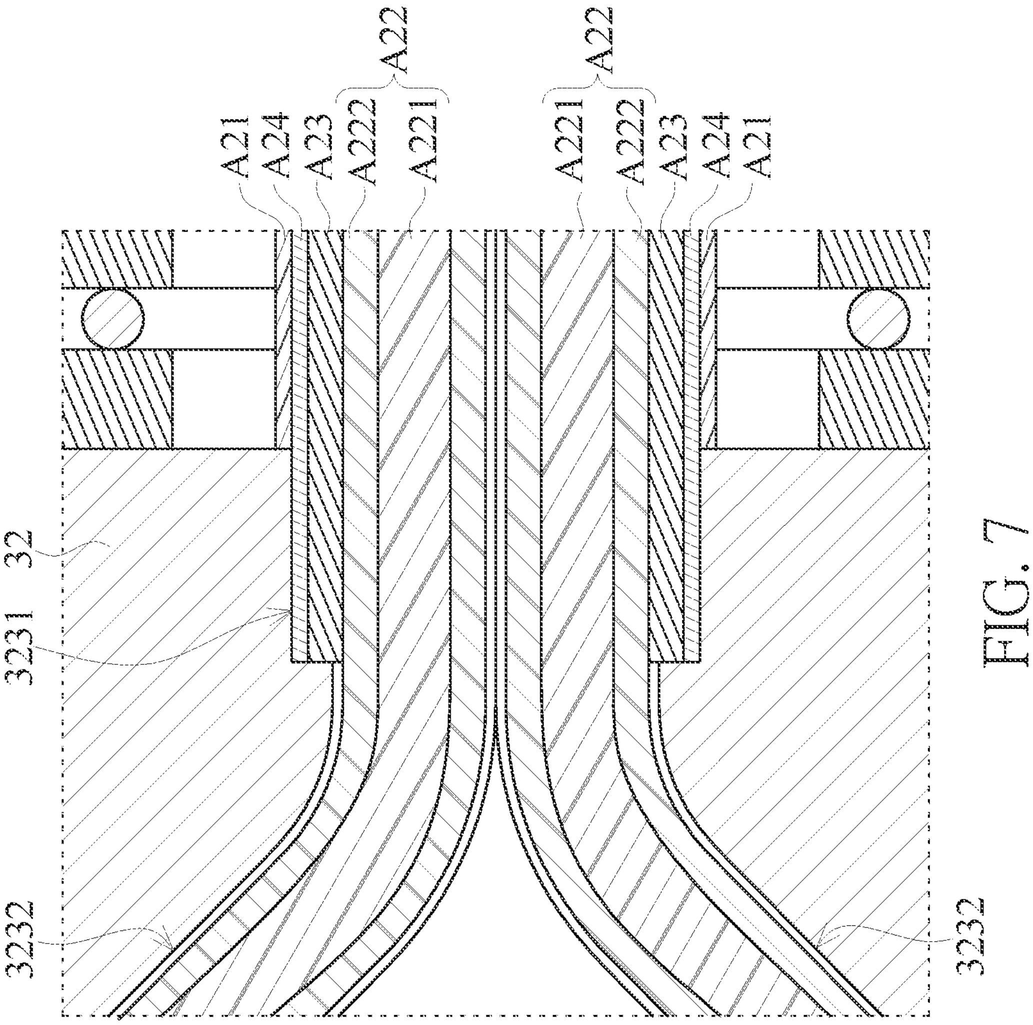
FIG. 7 is a partially enlarged schematic view of FIG. 5.

As shown in FIGS. 6 and 7, the cable A2 includes an outer insulator A21, two core wires A22, an aluminum foil outer conductor A23 and two steel wire outer conductors A24. The two core wires A22 are wrapped by the outer insulator A21, each of the core wires A22 includes an inner conductor A221 and an insulator A222, and the inner conductor A221 is wrapped by the insulator A222. The aluminum foil outer conductor A23 wraps the insulators A222 of the two core wires A22, the aluminum foil outer conductor A23 of the cable A2 is held by the end sections 3231 of the two inner metal members 32, and the insulator A222 of each core wire A22 is together held by one of the branch sections 3232 of the two inner metal members 32. In this way, the cable A2 being moved back and forth relative to the cable connection assembly A1 by external forces can be effectively avoided. Each of the steel wire outer conductors A24 together with the aluminum foil outer conductor A23 are held by the end sections 3231 of the two inner metal members 32, such that an overall anti-interference capability of the cable A2 can be further improved, and loss of the cable A2 during signal transmissions can be further reduced. In practical applications, the cable A2 can be, for example, a twinaxial cable, but the present disclosure is not limited thereto. Through the design of the holding component 3 including two inner metal members 32, and each of the inner metal members 32 using the end section 3231 to jointly hold the aluminum foil outer conductor A23 and steel wire outer conductor A24 of the cable A2 in place, the holding component 3 can tightly hold the cable A2 in place.

It should be noted that the above-mentioned cable connection component A1 can also be manufactured, implemented and sold independently, and is not limited to being manufactured, implemented and sold only together with the cable assembly A.

In conclusion, in the cable assembly and cable connection component provided by the present disclosure, through the above design of the first outer metal member, the second outer metal member, the two inner metal members included in the holding member, and the wire slot of each of the inner metal members, such that the cable assembly and the cable connection component can be provided with better anti-interference capabilities than the existing cables.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cable connection component, adapted to fix an end of a cable in place, the cable including an outer insulator and two core wires, the two core wires being wrapped by the outer insulator, each of the core wires including an inner conductor and an insulator, and the inner conductor being wrapped by the insulator, the cable connection component comprising:

a first outer metal member having a guiding structure at an end thereof, wherein two connection conductors are disposed in the first outer metal member, and two insulating structures are disposed between the two connection conductors and the first outer metal member, respectively;

a second outer metal member having an end detachably fixed to the end of the first outer metal member; and a holding component disposed between the first outer metal member and the second outer metal member and being held in place by the first outer metal member and the second outer metal member, wherein the holding component has a guide structure at an end thereof for engaging with the guide structure of the first outer metal member;

wherein the holding component includes two inner metal members, and the two inner metal members are fixed to each other by at least one fixing member, each of the inner metal members includes a wire slot, the wire slot includes an end section and two branch sections, an end of the two branch sections is connected with the end section, the end sections of the wire slots of the two inner metal members jointly hold a portion of the cable in place, the branch sections of the two inner metal members jointly hold the insulator of one of the core wires in place, and the inner conductor of each of the core wires is exposed at the end of the holding component, and is connected to the two connection conductors of the two first outer metal members.

2. The cable connection component according to claim 1, wherein a side of each of the inner metal members that has the wire slot formed therewith has at least one positioning structure, and the at least one positioning structure of one of the inner metal members is configured to be mutually engaged with the at least one positioning structure of another of the inner metal members.

3. The cable connection component according to claim 1, wherein the end of the first outer metal member that has the guide structure formed therewith further has a limiting groove, the holding component has a limiting portion for engaging with the limiting groove, and accordingly restricts a range of motion in which the holding component and the first outer metal member are rotatable relative to each other.

4. The cable connection component according to claim 1, wherein the cable further includes an aluminum foil outer conductor, the aluminum foil outer conductor wraps the insulators of the two core wires, and the aluminum foil outer conductor of the cable is held in place by the end sections of the two inner metal members.

5. The cable connection component according to claim 4, wherein the cable further includes two steel wire outer conductors, each of the steel wire outer conductors is disposed between the aluminum foil outer conductor and the outer insulator, and each of the steel wire outer conductors is held together with the aluminium foil outer conductor by the end sections of the two inner metal members.

6. A cable assembly comprising:

a cable including an outer insulator and two core wires, wherein the two core wires are wrapped by the outer insulator, each of the core wires includes an inner conductor and an insulator, the inner conductor is wrapped by the insulator;

a cable connection component for fixing an end of the cable, wherein the cable connection component includes:

a first outer metal member having a guiding structure at an end thereof, wherein two connection conductors are disposed in the first outer metal member, and two insulating structures are disposed between the two connection conductors and the first outer metal member, respectively;

a second outer metal member having an end for interlocking with the end of the first outer metal member; and a holding component disposed between the first outer metal member and the second outer metal member and being held in place by the first outer metal member and the second outer metal member, wherein the holding component has a guide structure at an end thereof for engaging with the guide structure of the first outer metal member;

wherein the holding component includes two inner metal members, and the two inner metal members are fixed to each other by at least one fixing member, each of the inner metal members includes an end section and two branch sections, an end of the two branch sections is connected with the end section, the end sections of the two inner metal members jointly hold a portion of the cable in place, the branch sections of the two inner metal members jointly hold the insulator of one of the core wires in place, and the inner conductor of each of the core wires is exposed at the end of the holding component, and is connected to the two connection conductors of the two first outer metal members.

7. The cable assembly according to claim 6, wherein a side of each of the inner metal members that has the wire slot formed therewith further has at least one positioning structure, and the at least one positioning structure of one of the inner metal members is configured to be mutually engaged with the at least one positioning structure of another of the inner metal members.

8. The cable assembly according to claim 6, wherein the end of the first outer metal member that has the guide structure formed therewith further has a limiting groove, the holding component has a limiting portion for engaging with the limiting groove, and accordingly restricts a range of motion in which the holding component and the first outer metal member are rotatable relative to each other.

9. The cable assembly according to claim 6, wherein the cable further includes an aluminum foil outer conductor, the aluminum foil outer conductor wraps the insulators of the two core wires, and the aluminum foil outer conductor of the cable is held in place by the end sections of the two inner metal members.

10. The cable assembly according to claim 9, wherein the cable further includes two steel wire outer conductors, each of the steel wire outer conductors is disposed between the aluminum foil outer conductor and the outer insulator, and each of the steel wire outer conductors is held together with the aluminium foil outer conductor by the end sections of the two inner metal members.

* * * * *